(12) United States Patent
Hautala

(10) Patent No.: US 10,738,420 B2
(45) Date of Patent: Aug. 11, 2020

(54) METHOD FOR SCREENING AND A SCREENING APPARATUS

(71) Applicant: RED WIRE OY, Tampere (FI)

(72) Inventor: Jouko Hautala, Tampere (FI)

(73) Assignee: RED WIRE OY, Tampere (FI)

(*) Notice: Subject to any disclaimer, the term of this patent is extended or adjusted under 35 U.S.C. 154(b) by 152 days.

(21) Appl. No.: 16/078,748

(22) PCT Filed: Feb. 23, 2017

(86) PCT No.: PCT/FI2017/000003
§ 371 (c)(1),
(2) Date: Aug. 22, 2018

(87) PCT Pub. No.: WO2017/158228
PCT Pub. Date: Sep. 21, 2017

(65) Prior Publication Data
US 2019/0048524 A1    Feb. 14, 2019

(30) Foreign Application Priority Data
Mar. 16, 2016  (FI) .................................. 20160064

(51) Int. Cl.
*D21D 5/02* (2006.01)
*B01D 29/88* (2006.01)
(Continued)

(52) U.S. Cl.
CPC .......... *D21D 5/026* (2013.01); *B01D 29/885* (2013.01); *B07B 1/20* (2013.01); *D21B 1/32* (2013.01)

(58) Field of Classification Search
CPC ......... D21D 5/026; B01D 29/885; B07B 1/20
(Continued)

(56) References Cited

U.S. PATENT DOCUMENTS 4,267,035 A    5/1981  Martin
4,749,474 A    6/1988  Young
(Continued)

FOREIGN PATENT DOCUMENTS

CA    1335191 C    4/1995
CN    1755013 A    4/2006
(Continued)

OTHER PUBLICATIONS

International Search Report & Written Opinion dated Jun. 27, 2017 corresponding to International Patent Application No. PCT/FI2017/000003.
(Continued)

*Primary Examiner* — Terrell H Matthews
(74) *Attorney, Agent, or Firm* — Squire Patton Boggs (US) LLP

(57) ABSTRACT

The present invention is directed to methods and apparatus for screening a pulp suspension where the pulp suspension is directed to a screening space, where a part of the fibres in the pulp is screened using a drum-type rotor. The residual pulp suspension is then directed to a dilution space where it is mixed with recirculated pulp flow and the pulp suspension in the dilution space will be screened. Resulting preliminary reject flow is directed to a mixing space where it mixes with a dilution flow. The recirculated pulp flow is then directed back to the dilution space.

13 Claims, 6 Drawing Sheets

(51) Int. Cl.
    *B07B 1/20*    (2006.01)
    *D21B 1/32*    (2006.01)

(58) Field of Classification Search
    USPC .......................................................... 209/273
    See application file for complete search history.

(56) References Cited

U.S. PATENT DOCUMENTS

| | | | | |
|---|---|---|---|---|
| 4,749,475 | A * | 6/1988 | Hooper | B01D 29/118 |
| | | | | 209/273 |
| 5,000,842 | A * | 3/1991 | Ljokkoi | D21D 5/026 |
| | | | | 209/273 |
| 5,096,127 | A * | 3/1992 | Young | D21D 5/026 |
| | | | | 162/55 |
| 5,798,025 | A * | 8/1998 | Iwashige | B01D 29/118 |
| | | | | 162/261 |
| 6,290,067 | B1 | 9/2001 | Bergdahl et al. | |
| 6,938,846 | B1 * | 9/2005 | Kristrom | D21D 5/06 |
| | | | | 209/304 |
| 7,296,684 | B2 * | 11/2007 | Gabl | D21D 5/026 |
| | | | | 209/273 |
| 7,641,767 | B2 * | 1/2010 | Binder | D21D 5/026 |
| | | | | 162/243 |
| 9,085,851 | B2 * | 7/2015 | Hautala | D21D 5/026 |

FOREIGN PATENT DOCUMENTS

| | | |
|---|---|---|
| EP | 0025310 A1 | 3/1981 |
| EP | 0 473 354 A1 | 3/1992 |
| EP | 0 649 940 A1 | 4/1995 |
| WO | WO 2011/113990 A1 | 9/2011 |

OTHER PUBLICATIONS

First Office Action dated Feb. 3, 2020 corresponding to Chinese Patent Application No. 201780003829.9, and English translation thereof.

European Search Report dated Aug. 28, 2019 corresponding to European Patent Application No. 17765911.7.

* cited by examiner

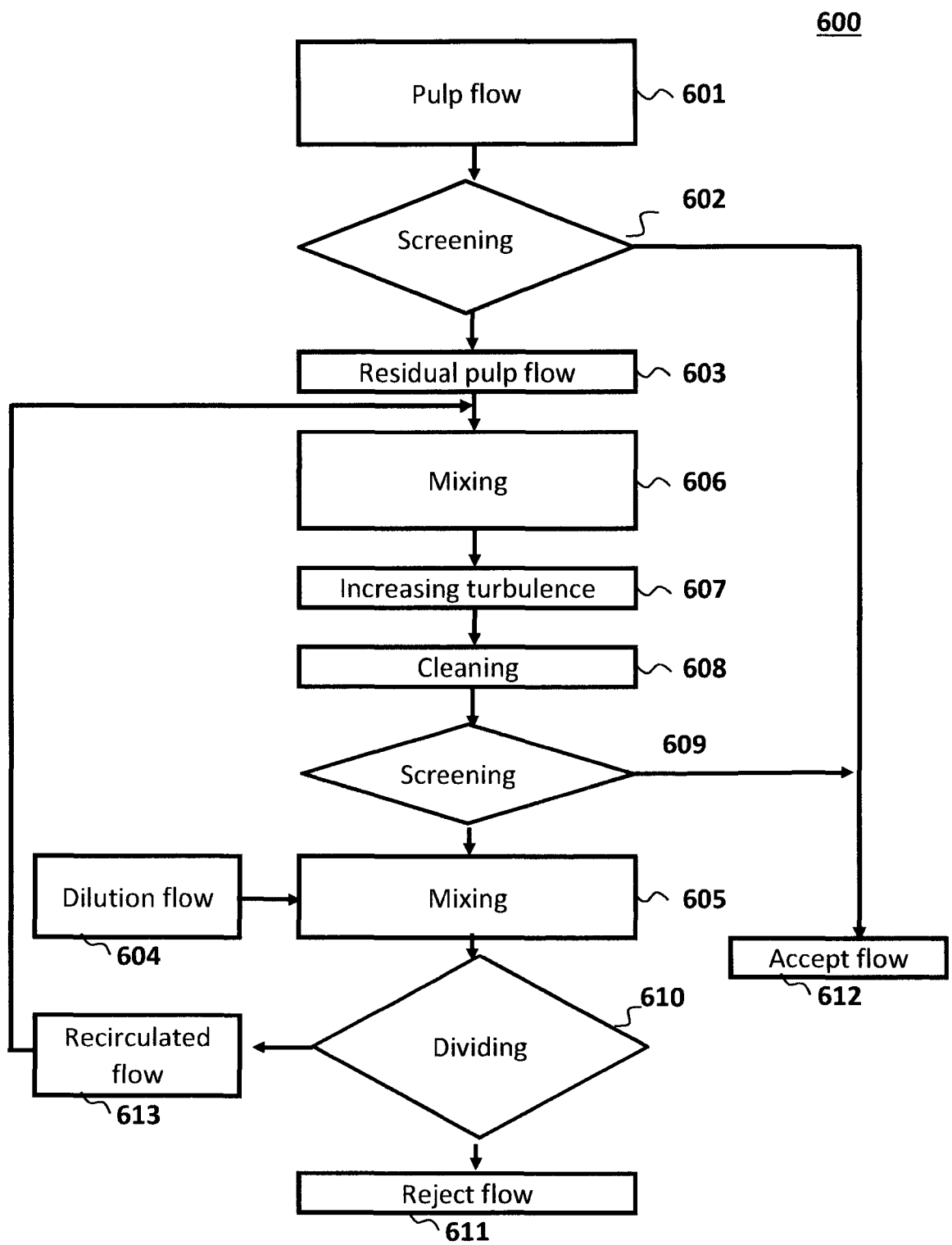

METHOD FOR SCREENING AND A SCREENING APPARATUS

This invention relates to a screening apparatus for screening a pulp suspension and a method for doing the same.

Pulp screening is a key process in pulp and paper production and it is used to enhance the quality of a wide range of pulp and paper products. In the screening process the pulp suspension fed to the screening apparatus is divided to an accept flow and a reject flow. The accept flow continues forward in the process and the reject flow will be retreated so that it can be usually purified more, refined or totally removed from the process.

In one type of a pulp screening apparatus, like the one shown in U.S. Pat. No. 8,869,989, a drum-type rotor is rotating inside a cylindrical filtering screen. Publications EP0025310, U.S. Pat. Nos. 4,749,475, 7,296,684 and 5,798, 025 disclose other types of pulp screening apparatus having rotating rotors of different shapes.

Figure 1:
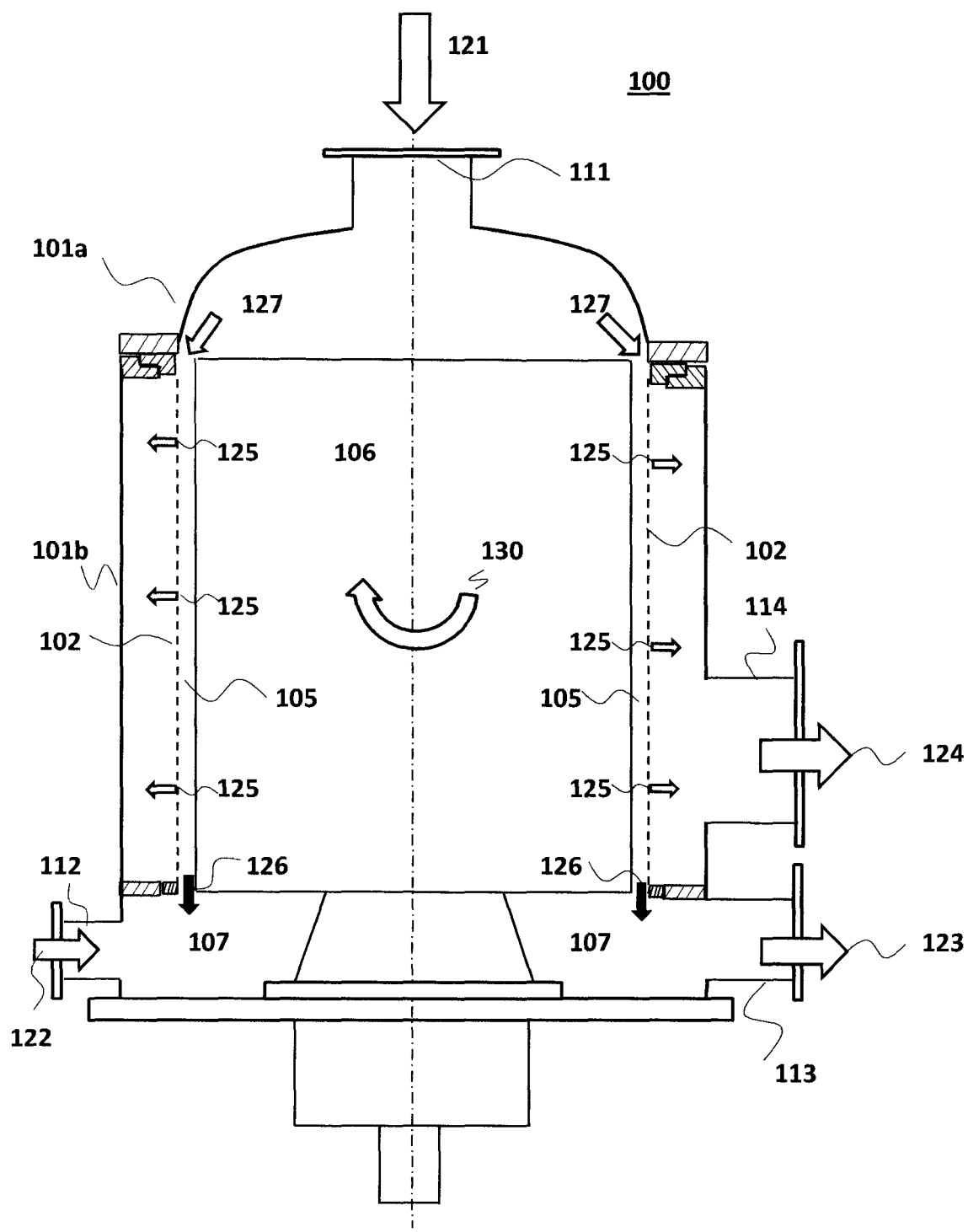

FIG. 1 shows the basic operating principle of the drum-type screening apparatus (100). The apparatus consists of a cover (101a) and a housing (101b) inside which a cylindrical filtering screen (102) is located. Inside the cylindrical filtering screen (102) a drum-like rotor (106), powered by a motor (not shown), is rotating as indicated by arrow (130). An incoming pulp suspension flow (121) is fed to the apparatus via an inlet port (111) and it flows, as indicated by the arrows (127) in FIG. 1, to a narrow screening space (105) between the rotor (106) and the screen (102). Forces caused by the pressure of the flow and by the rotating rotor (106) push the pulp suspension against the screen (102) and a part of the pulp suspension flows through as indicated by arrows (125) in the FIG. 1. The characteristics of the apparatus, like the size, shape and number of holes or slots in the screen (102) as well as the operational parameters of the apparatus, like the rotating speed of the rotor (106), determine the characteristics of the fibres passing through the screen (102). Thus by selecting the characteristics and operational parameters of the apparatus the operator can select the characteristics of the fibres in the pulp suspension flow passing through the screen (102). The part of the pulp suspension (125) passing through the screen forms an accept flow (124), which is directed out of the apparatus via an accept outlet (114).

The part of the incoming pulp suspension flow (121), which does not pass through the screen (102), continues to flow towards the bottom of the apparatus, finally ending in the reject space (107) as indicated by the arrows (126) in the FIG. 1. A rinse flow (122) is directed via a rinse inlet (112) to the reject space (107). The rinse flow (122) rinses the reject space (107) and combines with the pulp suspension flows (126) entering the reject space (107) from the screening space (105) between the rotor (106) and the screen (102). Together the flows (122, 126) form a reject flow (123), which is directed out of the apparatus via a reject outlet (113).

When pulp suspension is being purified or fractionated, the consistency of the pulp suspension tends to increase as the pulp flow (127) travels further in the screening space (105) between the screen (102) and the rotor (106). This is because the water in the pulp suspension can pass through the filtering screen (102) more easily than the fibres in the pulp suspension can. Attempts have been made to solve this thickening phenomenon with the design of the rotor, especially with designs where some part of the water passing through the screen (102) is sucked back to the other side of the filtering screen (102), i.e. back to the screening space (105). This kind of action causes harm especially when one tries to fractionate the pulp, because short and elastic fibres come back with the water, thus lessening the efficiency of the fractionating process.

One use of drum-like rotor based screening apparatus is screening a pulp suspension before a paper or board machine. Typically there are several screening apparatus connected in series so that the reject flow (123) of a previous apparatus will act as the incoming flow (121) for the next one. As the reject flow of the last apparatus is typically removed from the process, all the fibres in the last reject flow are lost. Thus less actual fibres the final reject has, the more economical the process is. Therefore, in the prior art solution it is preferred to keep the part of the flow (126) not passing through the screen (102) as small as possible compared to the incoming pulp suspension flow (121). This causes the speed of the flow in the screening space (105) closer to the reject space (107) to become slow compared to the speed of the flow (127) entering the screening space (105). This makes the above explained problem of thickening even worse and can cause plugging of the screen (102). To prevent this the rotation speed of the rotor (106) can be increased, but that requires more energy and also increases the wear of the screen (102).

Another problem of prior art occurs if the rinse flow (122) is greater than the reject flow (123). In such a situation part of the rinse flow (122) reaches the screen (102) and actually passes through and becomes part of the accept flow (124) and can at least temporarily block the flow (126) and thus make the problem of thickening and plugging even more serious.

With the apparatus and a method according the invention as claimed the above mentioned problems of the invention can be solved.

The present invention is directed to methods and apparatus for screening a pulp suspension where the pulp suspension is directed to a screening space, where a part of the fibres in the pulp is screened. The residual pulp suspension is then directed to a dilution space where it is mixed with a recirculated pulp flow and the pulp suspension in the dilution space will be screened. Resulting preliminary reject flow is directed to a reject space where it mixes with a dilution flow. The recirculated pulp flow is then directed back to the dilution space.

In some variations, one or more of the features disclosed herein including one or more of the following features can optionally be included in any feasible combination. The methods or apparatus could comprise dividing the suspension in the reject space into the recirculated pulp flow and a reject flow. Turbulence in the dilution space could be increased by mixing element or elements. The methods or apparatus could comprise cleaning the filtering screen bordering the dilution space by cleaning element or elements. In some variations the mixing and/or cleaning elements are attached to the rotor and in some variations the elements are achieved by the shape of the rotor. In some variations the dilution space is at least partly bordered by the bottom of the rotor.

Various objects, features, aspects, and advantages of the present invention will become more apparent from the following detailed description of preferred embodiments of the invention, along with the accompanying drawings.

SHORT DESCRIPTION OF THE FIGURES

FIG. 1: Drum-type screening apparatus

Figure 2:
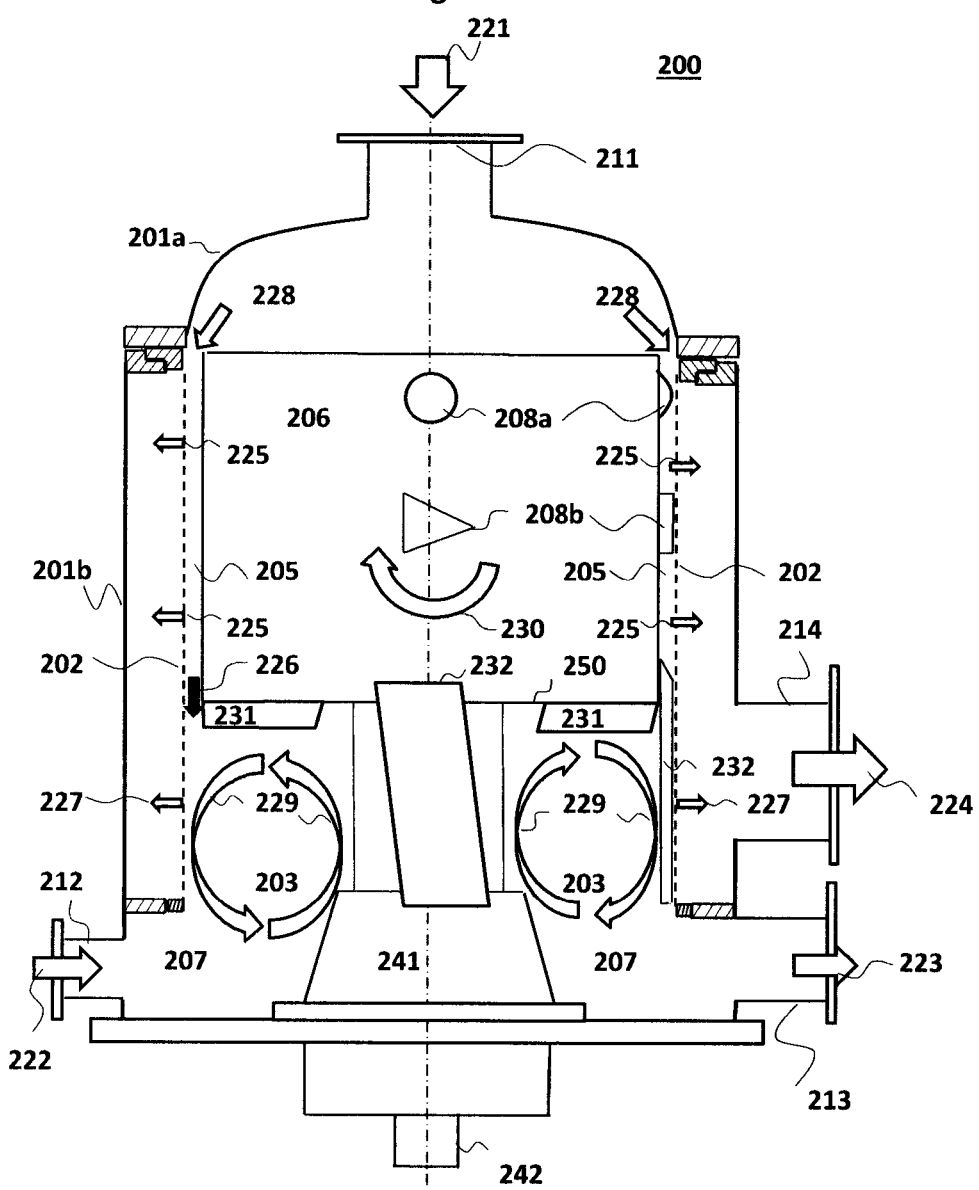

FIG. 2: One embodiment of the apparatus according the invention

Figure 3:
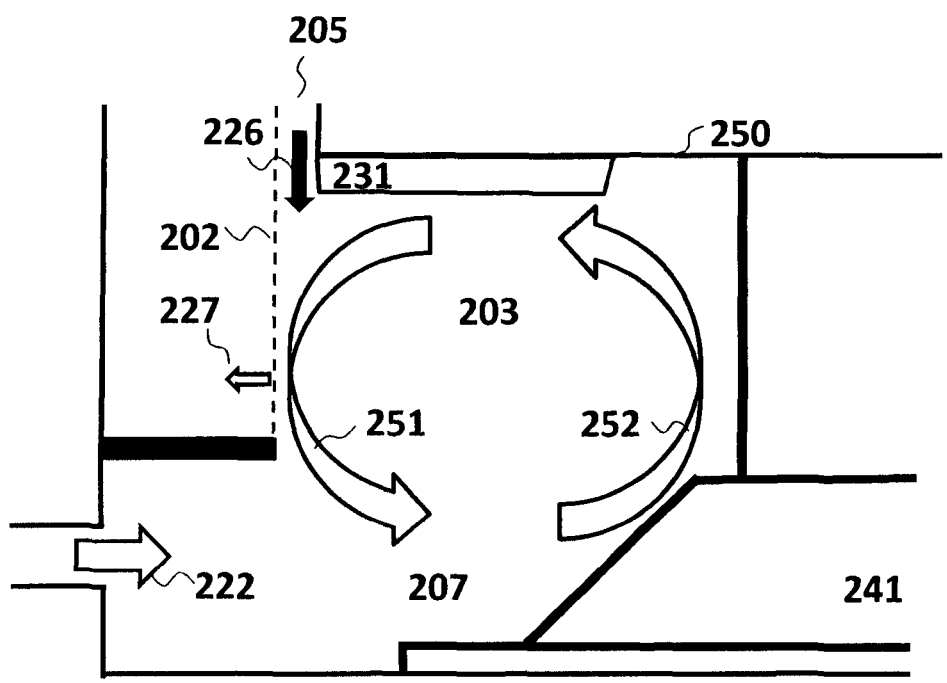

FIG. 3: Detail of one embodiment of the apparatus according the invention

Figure 4:
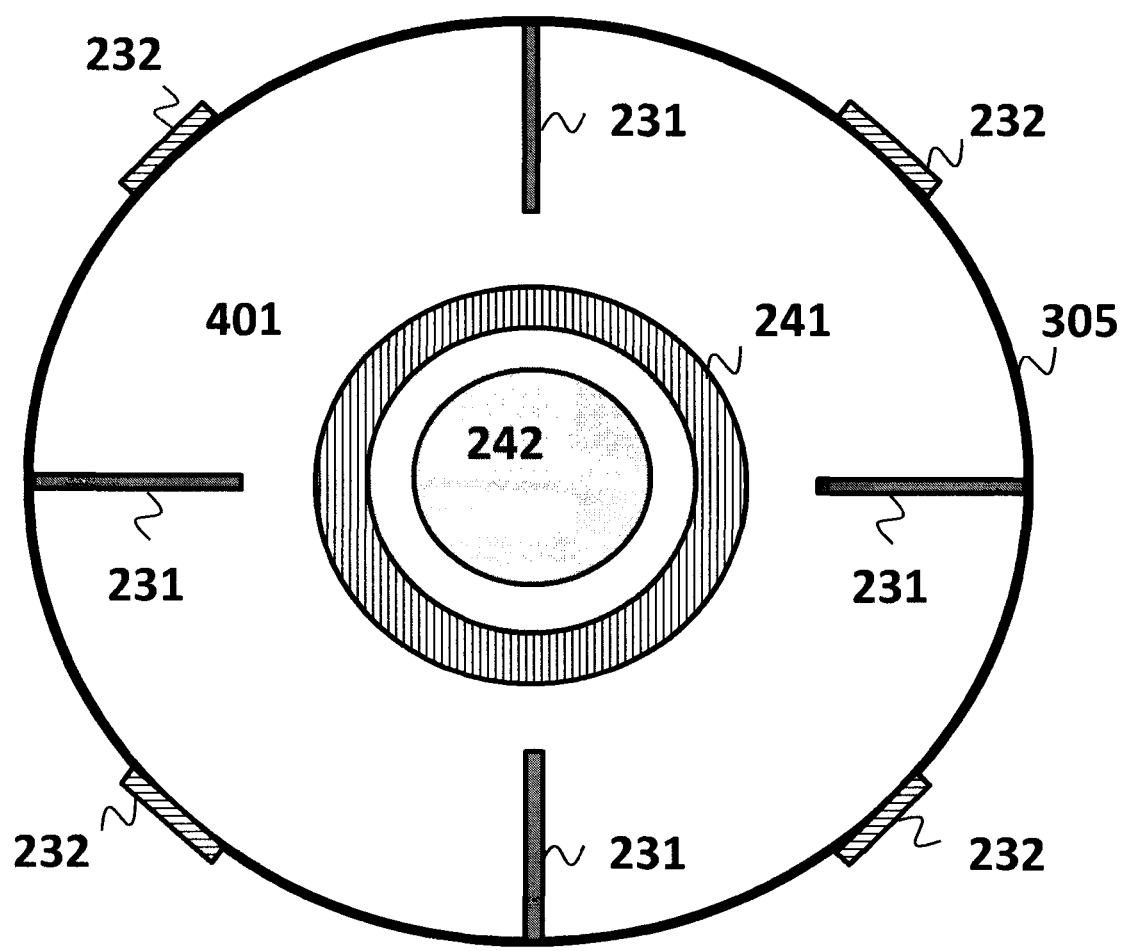

FIG. 4: Bottom of the rotor of one embodiment of the apparatus according the invention FIG. 5: One embodiment of the apparatus according the invention FIG. 6: One embodiment of the method according the invention A screening apparatus can be configured vertically so that the incoming pulp suspension flow is fed to top of the apparatus and the rejected material flows downwards, helped not only by the direction of the pulp suspension flow, but also by the gravity of Earth. It is however understood that the apparatus could be configured in other orientations too, e.g. horizontally or even so that the pulp suspension flows against the gravity. In the context of this application directions "up" and "down" are used in relation to the direction of the main pulp suspension flow. So if the apparatus is in a horizontal configuration and the pulp suspension flows from left to right, the "down" in the context of this application is to be understood to the flowing direction of the main flow, i.e. to the right. Similarly any direction oriented language should be understood in relation to the pulp suspension flow. So in the above mentioned horizontal configuration the bottom of the rotor should be understood as side of the rotor facing the reject space.

FIG. 2 shows one embodiment of the drum-type screening apparatus (200) according the invention and FIG. 3 shows a detail of an apparatus of FIG. 2.

The apparatus (200) consists of a cover (201a) and a housing (201b) inside which a cylindrical filtering screen (202) is located. Inside the cylindrical filtering screen (202) a cylindrical drum-like rotor (206), powered by a motor, not shown, is rotating as shown by arrow (230). The pulp suspension flow (221) is fed to the apparatus via an inlet port (211) or multiple inlet ports and it flows to a narrow screening space (205) between the rotor (206) and the screen (202) as indicated by the arrows (228). The forces caused by pressure of the flow itself and by the rotating rotor (206) push the pulp suspension against the screen (202) and part of the pulp flows through creating primary screening flows indicated by arrows (225) in FIG. 2. The primary screening flows (225) passing through the screen (202) form a part of the accept flow (224), which is directed out of the apparatus (200) via one or more accept outlets (214). The part of the pulp suspension flows (228), that does not pass through the screen (202), continues to flow towards the bottom of the apparatus.

The rotor (206) can be equipped with hydrodynamic elements or foils (208a, 208b), which are used to accelerate the flow of the pulp in the rotating direction as well as induce a turbulence on the surface of the screen (202) in order to prevent plugging of the screen (202). The elements (208a, 208b) can have various shapes, e.g. round and convex (208a) or triangle with flat top (208b), can be used.

The residual pulp flow (226), which has not passed through the screen (202), flows, as indicated by the arrows (226), to a dilution space (203). In one embodiment of the invention the dilution space (203) is bordered from the sides by the screen (202), which extends substantially past the bottom (250) of the rotor (206). The other sides of the dilution space (203) can be bordered by the bottom (250) of the rotor (206), the reject space (207), and at the center by the axle support structure (241) housing an axle (242) connecting the rotor (206) to a motor (not shown), as well as a bearing unit allowing the axle (242) to rotate inside the structure (241). In some embodiment the bottom (250) of the rotor consists of a ring shaped part attached to the cylindrical part of rotor effectively sealing the cylindrical part and preventing any flow through it.

As shown in FIG. 3, in the dilution space (203) the residual flow (226) mixes with a recirculated flow (252) resulting a combined flow with lower consistency. The combined suspension in the dilution space (203) is pushed against the filtering screen (202) and part of fibres in suspension pass through the screen (202) forming a secondary accept flow as indicated by the arrows (227) in FIGS. 2 and 3. Some of the suspension in the dilution space (203) not passing through the screen (202) will flow to reject space (207) as a preliminary reject flow, indicated as arrow (251) in FIG. 3.

A dilution flow (222) is directed via at least one dilution inlet (212) to a mixing space inside the apparatus where it mixes with the high consistency preliminary reject flow (251), diluting it. In one embodiment of the invention the reject space (207) acts as a mixing space, in some other embodiment the mixing of the dilution flow happens both in the reject space (207) and in the dilution space (203), thus the mixing space can be understood as a combination of these spaces. Yet in other embodiment the mixing of dilution flow happens only in the dilution space (203). It is also understood that the reject space (207) and dilution space (203) can share the same physical space, so from a mechanical point of view one can understand the dilution space (203) as an extended reject space (207).

In some embodiment according the invention the suspension in the mixing space, that is in reject space (207) and/or dilution space (203), is divided to two separate flows; reject flow (223) and recirculated flow (252). This division can be achieved for example by simply directing the part of the suspension that results from the above explained mixing of the preliminary reject flow (251) and the dilution flow (222), present in the mixing space, as indicated earlier in some embodiments this could be the reject space (207), out of the apparatus (200), via reject outlet or outlets (213) as reject flow (223).

In some embodiments, at least a part of suspension present in the reject space (207), not removed out of the apparatus as a reject flow (223), flows back to the dilution space (203) as recirculated flow (252), taking at least part of the fibres which have ended to the reject space (207), or more generally to a mixing space, with it. This recirculated flow is indicated by an arrow (252) in the FIG. 3. Due to the dilution effect of the dilution flow (222), the consistency of the recirculated flow (252) is lower than the consistency of the preliminary reject flow (251) entering the reject space (207) from the dilution space (203). The upward flowing recirculated flow (252) hits the bottom (250) of the rotor (206) and turns towards the edge of the rotor where the recirculated flow (252) meets the residual flow (226) entering the dilution space (203). As explained before the two flows mix and the consistency of the residual flow (226) is reduced, i.e. the residual flow is diluted.

The circular flow indicated by the double arrows (229) in the FIG. 2, where the flow raises upward towards the rotor (206) in the center of the apparatus next to the axle support structure (241) and flows downwards towards the reject space (207) next to the filtering screen (202), pushes the suspension in the dilution space (203) against the screen (202). As the consistency of the suspension has been reduced compared to the residual flow (226) entering the dilution space (203), it is easier for the fibres in the suspension in the dilution space to pass through the screen (202) as a secondary accept flow as indicated by the arrows (227) in FIGS. 2 and 3. Thus in addition to the primary screening happening when the pulp suspension in the screening space (205) passes through the screen (202), a secondary screening happens when the pulp suspension in the dilution space (203) passes through the screen.

It is also noted that due to the circular flow (229) the fibers circulating in the dilutions space (203) or between the dilution space (203) and the reject space (207) might pass next to the filtering screen (202) several times before they finally end up in the reject flow (223). This further increases the possibility of the fibres to pass through the filtering screen (202), which reduces the amount of fibres on the reject flow and thus increases the operational efficiency of the apparatus.

Furthermore in some embodiment, the circular turbulent flow (229) washes the filtering screen (202) thus reducing the plugging, which also in turn makes it easier for the fibres to pass through the screen (202).

The secondary screening flows (227) combine with the primary screening flows (225) passing the screen (202) in the primary screening to form a part of the accept flow (224) exiting the apparatus via the outlet port or ports (214).

In some embodiment on the invention, due to the reduced plugging of the screen (202) the rotation speed of the rotor (206) can also be reduced, compared to the prior art solution. This in turn results in a more energy efficient operation of the apparatus.

The added turbulence due to the circular flow (229) also increases the possibility of the fibres to pass through the screen (202). In some embodiment the turbulence in the dilution space can further be increased by mixing elements (231) extending to the dilution space (203). In one embodiment of the invention the mixing elements (231) are attached to the bottom (250) of the rotor (206) from where they extent to the dilution space (203).

As the turbulent circular flow (229) circulates in the dilution space (203) next to the screen (202), some of the dilution flow (222) fed to the apparatus via the inlet port or ports (212) might pass through the screen (202) to the accept flow with the fibres. In the prior art solutions it would be undesirable to let the rinse flow pass through the filtering screen. Contrary to the prior art solution, in some embodiments according to the invention it would be preferable to allow the use of higher dilution flow rates compared to the flow rates of the reject flow (223). Due to the effect explained above, e.g. the circular flow (229) and the reduced consistency of the pulp in the secondary screening, this would allow more fibres to pass the screen (202) to the accept flow (224) and reduce the amount of fibres in the reject flow (223), thus solving the thickening problem of the prior art solution, while still keeping the reject flow (223) sufficient for removing undesirable material from the apparatus. Thus in some embodiment of the invention the flow rate of the dilution flow (222) fed to the apparatus (200) via the inlet port or ports (212) is larger than the flow rate of the reject flow (223) exiting through the reject outlet or outlets (213).

One of the advantages of the invention is that the amount of fibres in the reject flow can be significantly reduced. In the solutions requiring several screening apparatus connected one after the another, like screening a pulp suspension before a paper or board machine, an embodiment of the invention could allow sufficient screening to be achieved with fewer number of screening apparatus than the prior art solutions.

In some embodiments the dilution space (203) is bordered partly by the screen (202) and partly by the bottom (250) of the rotor. Other parts bordering the dilution space (203) can in some embodiment be e.g. the axle support structure (241), the bottom of the reject space (207), or if the reject space (207) and dilution space (203) are taken as separated spaces, the upper limit of the reject space (207) itself.

In other embodiment of the invention the plugging of the screen (202) is further reduced by cleaning elements (232), which clean the inside surface area of the screen (202). In the embodiment shown in FIG. 2 the cleaning elements (232) are attached to the side of the rotor (206) and extended past the bottom (250) of the rotor (206) to as far as the screen (202) extends. It is understood that the cleaning elements can be attached to the rotor also differently. In some embodiment the cleaning elements are attached for example to the bottom of the rotor (206).

In one embodiment of the invention the function of the cleaning elements (232) is combined with the function of mixing elements. In such a case the cleaning elements (232) do not only provide the cleaning of the filtering screen (202), but also provide the additional turbulence to the suspension in the dilution space (203). In another embodiment of the invention, both the separate mixing elements (231) and the cleaning elements (232) are present. Yet in another embodiment of the invention there are both separate mixing elements (231) as well as combined mixing and cleaning elements (232) present in the same apparatus.

In the FIG. 4 the bottom (250) of a rotor according to one embodiment of the invention is shown. In the figure several mixing elements (231) are attached to the bottom (250) of a rotor, which can extend to the dilution space. Also visible in the FIG. 4 are the axle support structure (241) housing the axle (242) and the cleaning elements (232) attached to the rotor.

Figure 5:
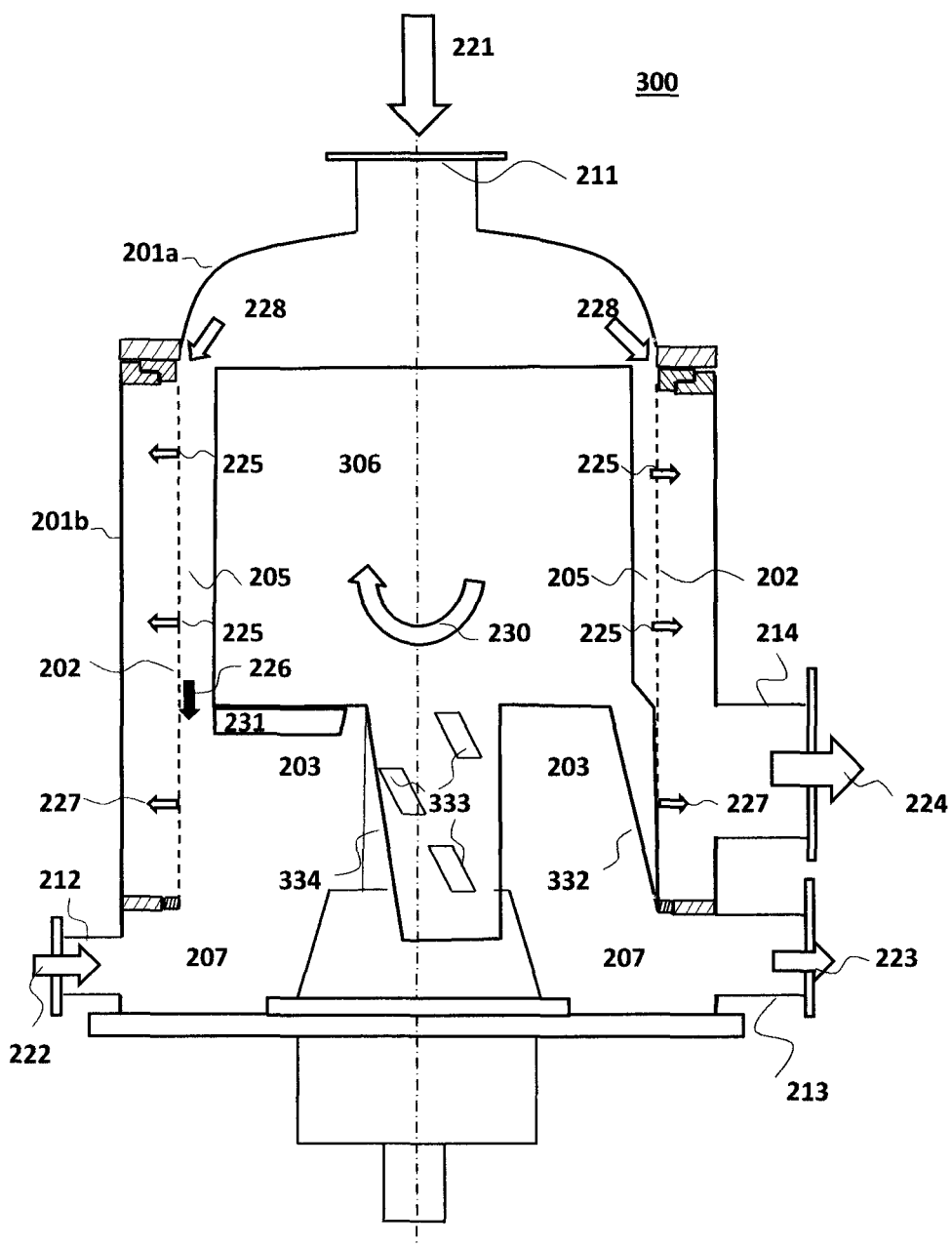

In FIG. 5 an apparatus (300) according one embodiment of the invention is shown. In the embodiment a part of the rotor (306), is shaped so that a suitable dilution space (203) is created. In this embodiment the total length of the cylindrical part of the rotor (306) can extent as far as or even past the screen (202). In some embodiments of the invention the embodiments explained in context of FIGS. 2, 3 and 4 can be combined with shaping of the rotor. In some embodiment the shaping of the rotor is achieved by cutting out parts of the cylindrical part of the rotor (306).

In other embodiment of the invention the cylindrical part of the rotor (306) and/or the bottom of the rotor is shaped so that part of the sides of the rotor and/or the bottom form the mixing elements (231) and the cleaning elements (332) or combined cleaning and mixing elements. The mixing element (334) can include separate elements (333) attached to it. These elements (333) can be cleaning elements or hydrodynamic elements or foils, or combination of these. In some embodiments such hydrodynamic elements or foils are attached to the cleaning elements (232) of the apparatus (200) shown in FIG. 2.

In some embodiment of the invention the rotor is shaped to produce a dilution space (203) of a predetermined shape and size under the bottom of the rotor (306). The flows as explained in connection to the FIGS. 2 and 3 are also present in the embodiment show in the FIG. 5, (not shown for clarity reasons) e.g the mixing of the dilution flow with the preliminary reject flow can happen in the reject space (207) or in the dilution space (203) or in the both of them.

In the embodiment shown in FIG. 5, each of the mixing elements (332, 334) drawn is different, but in some embodiment only one type of mixing elements is shaped from the rotor (306). Thus all mixing elements can be identical or at least follow the same principle of operation.

In FIG. 6 the method (600) according to one of the embodiments of the invention is described. Not all the aspects of the exemplary method described below need to be present in each embodiment of the method according the invention. Some aspects of the exemplary method can be omitted or carried out in a different order.

A pulp suspension is directed to a screening apparatus via at least one inlet port and inside the apparatus the pulp flow is directed (601) to a screening space between the filtering screen and a rotating drum-type rotor. As explained above in the context of the apparatus a primary screening (602) for the pulp suspension in the screening space is carried out by the filtering screen. A part of fibres in the pulp suspension will pass through the screen at this primary screening, forming a part of the accept flow, which is directed (612) out of the apparatus via an accept outlet port or ports.

The residual part of the pulp suspension flow, not passing through the screen, is directed (603) from the screening space to the dilution space, which, as explained in more detail in the context of the apparatus, can at least partly be bordered by the filtering screen.

In the dilution space the residual flow entering the dilution space mixes (606) with the recirculated flow effectively reducing the consistency of the residual flow i.e. the residual flow is diluted. In some embodiment of the invention the mixing of the residual flow happens only in the dilution space, in some embodiment only in the reject space, and in some embodiment the mixing happens both in the dilution and the reject space.

As explained in the context of the apparatus, the mixing in the dilution space can be enhanced or executed more effectively by increasing turbulence (607) in the dilution space by the use of mixing elements. Similarly the cleaning of the part of the screen extending to the dilution space can be performed (608) by using cleaning elements as explained in the context of the apparatus.

As explained in the context of the apparatus, the suspension in the dilution space is pushed against the filtering screen and a secondary screening of the pulp suspension is achieved (609). The secondary screening flow combines with the primary screening flow and both are directed (612) out of the apparatus via the outlet port or ports as an accept flow. The part of the suspension not passing through the filtering screen will flow to the reject space as the preliminary reject flow.

A dilution flow is directed (604) via at least one dilution inlet to the apparatus. In one embodiment of the invention the dilution flow is directed (604) either directly or via an intermediate space to a mixing space where it mixes (605) with the preliminary reject flow. In one embodiment of the invention the mixing happens in the reject space, but as explained earlier, the mixing could happen also in the dilution space or partly in the reject space and partly in the dilution space.

At least a part of the combined flow of the preliminary reject flow and dilution flow can be divided (610) into a reject flow and the recirculated flow and the reject flow is directed (611) out of the apparatus.

In some embodiment of the invention the recirculated flow is directed (613) back to the dilution space where it can mix (606) with the residual flow entering the dilution space from the screening space.

In some embodiment according the invention a circular flow is generated which causes the fibres in the dilution space to pass several rounds of mixing (606) of the residual pulp flow and the recirculated flow, secondary screening (609), mixing (605) of preliminary reject flow and the dilution flow and being divided (610) to the recirculated flow. That can, as explained earlier, increase the possibility of the fibres passing through the filtering screen The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method for screening a pulp suspension, the method comprising:
   directing a pulp suspension to a screening space between a filtering screen and a rotating drum-type rotor;
   screening a part of the fibres in the pulp suspension in the screening space through the screen;
   directing at least a part of the flow passing through the screen to at least one accept outlet;
   directing a reject flow to at least one reject outlet;
      directing a residual pulp flow from the screening space to a dilution space, the dilution space being bordered at least partly by the filtering screen;
      mixing the residual pulp flow with a recirculated pulp flow at least partly in the dilution space;
      screening a part of the fibres in the pulp suspension in the dilution space through the filtering screen;
      directing at least a part of a dilution flow to a reject space where it mixes with a preliminary reject flow; and
      directing the recirculated pulp flow to the dilution space.

2. The method according the claim 1, further comprising:
   dividing the suspension in the reject space into the recirculated pulp flow and a reject flow.

3. The method according the claim 1, further comprising:
   increasing the turbulence in the dilution space with at least one mixing element extending to the dilution space.

4. The method of claim 1, further comprising:
   cleaning the filtering screen bordering the dilution space by at least one cleaning element.

5. The method of claim 1, wherein
   the dilution space is bordered at least partly by a bottom of the rotor.

6. The method of claim 1, further comprising:
   increasing the turbulence in the dilution space with at least one element extending to the dilution space; and
   cleaning the filtering screen bordering the dilution space by said one element.

7. A screening apparatus for screening a pulp suspension, the apparatus comprising:

at least one inlet port for an incoming pulp suspension flow;

at least one inlet port for a dilution flow;

at least one outlet port for an accept flow;

at least one outlet port for a reject flow;

a filtering screen;

a drum-type rotor inside the filtering screen;

a screening space between the filtering screen and the rotor;

a reject space where at least a part of the dilution flow can mix with at least a part of a preliminary reject flow forming a recirculated pulp flow; and a dilution space arranged to receive a residual pulp flow from the screening space and the recirculated pulp flow from the reject space, wherein the filtering screen is extended to border, at least partly, the dilution space.

8. The screening apparatus of claim 7, the apparatus further comprising at least one mixing element extending to the dilution space.

9. The screening apparatus of claim 8, wherein the mixing element is attached to the rotor.

10. The screening apparatus of claim 8, wherein the rotor is shaped to form the mixing element.

11. The screening apparatus of claim 7, the apparatus further comprising at least one cleaning element configured to clean the part of the surface of the filtering screen bordering the dilution space.

12. The screening apparatus of claim 11 wherein the at least one cleaning element is also a mixing element extending to the dilution space.

13. The screening apparatus of claim 7, wherein the dilution space is at least partly bordered by a bottom of the rotor.

* * * * *